United States Patent [19]

Helms

[11] Patent Number: 5,148,110
[45] Date of Patent: Sep. 15, 1992

[54] METHOD AND APPARATUS FOR PASSIVELY DETECTING THE DEPTH AND LOCATION OF A SPATIAL OR TEMPORAL ANOMALY BY MONITORING A TIME VARYING SIGNAL EMANATING FROM THE EARTHS SURFACE

[76] Inventor: Ronald L. Helms, 10165 Palmer Dr., Oakton, Va. 22124

[21] Appl. No.: 487,127

[22] Filed: Mar. 2, 1990

[51] Int. Cl.⁵ .......................... G01V 3/08; G01W 1/16; G01R 19/00; G01R 23/00
[52] U.S. Cl. .................................... 324/323; 324/344; 324/348
[58] Field of Search ............... 324/323, 326, 334, 335, 324/344–349; 340/621; 73/170 R

[56] References Cited

U.S. PATENT DOCUMENTS 3,263,161  7/1966  Ruddock et al. ............... 324/345
4,616,184 10/1986  Lee et al. ....................... 324/335
4,825,165  4/1989  Helms et al. ................... 324/344

Primary Examiner—Walter E. Snow
Attorney, Agent, or Firm—K. L. Orzechowski

[57] ABSTRACT

A method and apparatus for passively determining the depth of an anomaly using means for monitoring a broad spectrum of frequencies and analyzing the amplitude and modulation of a time and/or location varying signal within discrete bands of frequencies to determine the depth of a spatial or temporal anomaly. A means for recording and mapping subterranean features based on an ascending or descending sequence of frequency measurements is also disclosed.

21 Claims, 8 Drawing Sheets

METHOD AND APPARATUS FOR PASSIVELY DETECTING THE DEPTH AND LOCATION OF A SPATIAL OR TEMPORAL ANOMALY BY MONITORING A TIME VARYING SIGNAL EMANATING FROM THE EARTHS SURFACE

The present application is related to U.S. Pat. No. 4,507,611 of Helms and U.S. Pat. No. 4,825,165 of Helms, et al.

BACKGROUND OF THE INVENTION

1. Field of the Invention

The present invention generally relates to a method and apparatus for determining the depth of an anomaly, regardless of the method used to determine the location of the anomaly in either a two-dimensional spatial or a temporal mode. More specifically, the present invention relates to monitoring a broad spectrum of frequencies simultaneously or individually in such a manner that the resultant two-dimensional spatial or temporal recording of a broad band of frequencies can be processed to display the spatial and/or temporal recording in a frequency sequence which will indicate the depth of the anomaly.

2. Description of the Prior Art

There are many ways of determining subsurface anomalies. Helms in U.S. Pat. No. 4,507,611 provides a method of detecting subsurface anomalies of the earth through two-dimensional spatial movement using measurements of generally vertical, alternating currents emanating from the earth's surface. Helms and Swanson in U.S. Pat. No. 4,825,165 provide a method and apparatus for locating and evaluating surface and subsurface anomalies and transient events while using temporal measurement techniques. The content of both of these patents are hereby incorporated by reference herein.

It is well known that magnetic techniques, as well as acoustic and visual methods and apparatus can be used to locate in either a temporal or a spatial mode surface and subsurface anomalies. For example, Ruehle, et al., in U.S. Pat. No. 3,363,457, teaches that the measurement of radiant energy from subsurface formations for geophysical prospecting. Weber, in U.S. Pat. No. 4,044,299 teaches a prospecting technique which includes the use of an inductive exciter which induces alternating current energy into the area and structure of the earth which is to be observed. Measurement of the induced current energy enables an artisan to determine the underground environment of the area.

A method and apparatus for measuring subsurface electrical subsurface electrical impedance utilizing first and second successively transmitted signals at different frequencies is taught by Maddem, et al. in U.S. Pat. No. 3,525,037.

In U.S. Pat. No. 3,942,101 to Sayer, et al. teaches a geophysical prospecting device which utilizes a distortion of the atmospheric electrostatic potential gradient which is suggested to be a result of Nernst effect. Sayer teaches that the distortion provides a means for locating subterranean sources of geothermal energy.

The earth's electromagnetic field also has naturally occurring alterations of the type known as "magnetic noise". Slichter, in U.S. Pat. No. 3,136,943, discloses that such noise is the product primarily of lightening and other electrical discharges and phenomenon. Geothermal prospecting can be performed by detecting variations in the naturally occurring electromagnetic radiations from thunderstorms or other phenomenon. The detection and measurement of short-term variations in the earth's magnetic field for geothermal prospecting is described in U.S. Pat. No. 3,126,510 to McLaughlin, et al.

Prospecting can also be performed by comparing simultaneous variations of an underground electric field and a magnetic field which results from the circulation of telluric currents. According to Cagniard, U.S. Pat. No. 2,677,801, this comparison of electric and magnetic fields requires the use of electrodes to measure the internal telluric currents in the magnetic field.

Machts, et al., in U.S. Pat. No. 2,124,825, describe an apparatus for investigating the electric and magnetic field conditions in an area being surveyed in order to locate irregularities indicative of earth strata, rock fractures, oil and water-bearing formations, etc.

Stanton, in U.S. Pat. No. 2,659,863, describes a method and apparatus for determining the presence of oil, mineral, and other subterranean deposits by measuring variations in a vertical potential gradient the atmosphere near the surface of the earth.

Morrison, U.S. Pat. No. 2,784,370, describes a prospecting device for locating subterranean anomalies which utilize measurements of electrical potential at or near the surface of the earth which results from "terrestial activity".

Barringer, in U.S. Pat. No. 3,763,419, describes a method and apparatus for geophysical exploration which utilizes very low frequency fields produced by distant transmitters as a source of a primary field. A vertical component of that field is used as a stable reference against which variations caused by discontinuities in the earth conductivity can be measured.

Miller, et al., in U.S. Pat. No. 4,041,372, describe a system which utilizes a current source to provide an input signal having predetermined frequency components, amplitude relationships, and duration. A plurality of spaced-apart detectors are used to make differential electrical measurements which permit cross correlation with the input signal.

SUMMARY OF THE INVENTION

It is an object of the present invention to provide a method and apparatus for passively determining the depth of a spatial or temporal anomaly.

It is a further object of the present invention to provide a method and apparatus for simultaneously or sequentially monitoring a broad spectrum of sequential frequencies and processing the signals so monitored to produce a recording which will display the monitored sequential frequencies.

Another object of the present invention is to evaluate and locate the depth of moving man-made and natural objects such as submarines, ice flows, or ocean currents.

Preferably, the sequential frequencies monitored may be derived from magnetic, current, acoustic, resistive, or other waves generated by physical or man-made phenomena, as long as the wave passes through the medium in which depth is to be determined. The presently preferred waves to be monitored are naturally occurring waves in the electromagnetic frequency range (0 to 100 KHZ or more preferably 1 to 50 KHZ). However, man-made signals, such as radio, television or radar, can also be passively monitored.

Preferably, a broad band of frequencies are processed so that the frequency sequence is displayed in either an ascending or descending sequence with the highest frequency at one end of the display and the lowest frequency and the other end. Data so displayed will show a consistent relationship of specific frequency range and the specific anomaly depth. This is true whether the anomaly is seismic in nature as in earthquakes or an anomaly detected by techniques such as the use of vertical alternating electric currents emanating from the earth used to locate mineral or geologic structure, as explained in U.S. Pat. Nos. 4,507,611 and 4,825,165.

Preferably, the measurement of the frequencies of interest is made using a non-directional antenna, a high-impedance input broad band receiver (e.g., 1 to 50,000 HZ), followed by an anti-alias filter feeding into an analog to digital converter. Through appropriate computer software, the time-varying broad band signal is stored on a computer disk. The data is later processed by a PC or the like as individual frequency lines. These processed frequency lines, when added in frequency sequence, result in the end product of the system. Other combinations, such as a spectrum analyzer as a receiver and a suitable recording device, such as a strip chart recorder or a magnetic tape recorder, can advantageously be used to prepare a readable record of the analyzed data.

After the broad range of frequencies has been recorded in either a temporal mode as described in U.S. Pat. No. 4,825,165 to Helms and Swanson or in a spatial mode as in U.S. Pat. No. 4,507,611 to Helms, the individual frequencies are processed and displayed in a frequency sequence. The depth of any given anomaly is then determined by noting the frequency at which it was observed. The relationship between frequency and depth is empirically determined, but in general higher frequencies will relate to anomalies near the surface and lower frequencies will relate to anomalies occurring or positioned at lower depths.

As used herein, "passively determining depth" refers to the use of monitoring a broad spectrum of sequential frequencies from a natural or man-made source, such as magnetic waves, acoustic waves, or generally alternating currents which emanate from the earth, which are then monitored and analyzed.

As used herein a "temporal anomaly" means a natural or man made occurrence such as an earthquake or passage of submarine respectively; a "spatial anomaly" means a natural or man made structure such as a geological structure or a buried (submerged) object such as a stationary submarine or sunken ship.

As used herein "depth" is intended to denote a depth relative to the surface of the earth, i.e., beneath the terrain or water surface of interest.

The method and apparatus of the present invention permits real time monitoring of such areas as faults in earthquake zones so that changes occurring can be observed in real time. Deep activity, medium depth activity and shallow activity can each be observed directly. Thus not only can pre-earthquake activity be observed and hence earthquakes predicted by projecting the observed changes, but also the depth of an actual earthquake can be determined if properly monitored. By careful processing the spectrum into very fine discrete lines, for example, every 1/10th of a HZ, or every HZ, a detailed picture of the substructure can be obtained. Different spectral spacing can advantageously be used for low, medium and high frequency monitoring. For example, at low frequencies, the spectrum can be directed to 1/10 to 1 HZ resolution; at medium frequencies 1-10 HZ may be adequate; and at higher frequency 10-100 HZ resolutions may be adequate. Details such as subterranean tunnels, pipes and cables could be mapped from processing passively or actively obtained data.

These same techniques will allow the depth of underwater objects like schools of fish, man-made objects, or oceanographic details such as layer depths, major salinity differences and flow dynamics such as boundary characteristics of streams like the Gulf Stream to be mapped. The disclosed method of monitoring a broad range of sequential frequencies will also enable determination of geologic details sufficient to locate specific deposits such as oil and gas as well as passive or active determination of the depth and thickness of these deposits.

By monitoring a broad range of frequencies of the above described alternating current or other broad frequency spectrum wave source in real time, dynamics of energy exchanges occurring within the earth's structure can indirectly be monitored which should assist in forecasting severe atmospheric events such as tornadoes and wind shear events. Different types of severe weather events can be identified by discrete sequential frequency characteristics that show up in a relatively broad frequency range, for example, about 0–100 KHZ. Characteristic frequency "signatures" for different severe weather events can be empirically determined. By monitoring and analyzing the frequency spectrum according to the present invention, impending severe weather events can be predicted and subsurface activity associated with those events can be monitored.

The present invention permits the user to obtain, by passive measurements, an image of the earth's subsurface similar to that obtained within a human body by a CAT Scan or a Nuclear Magnetic Resonance (NMR) Scan.

Additional objects, advantages, and novel features of the invention will be set forth in part in the description which follows, and in part will become apparent to those skilled in the art upon examination of the following or will be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate various embodiments of the present invention and, together with the description, serve to explain the principles of the invention. In the drawings.

DETAILED DESCRIPTION OF THE INVENTION

Figure 1:
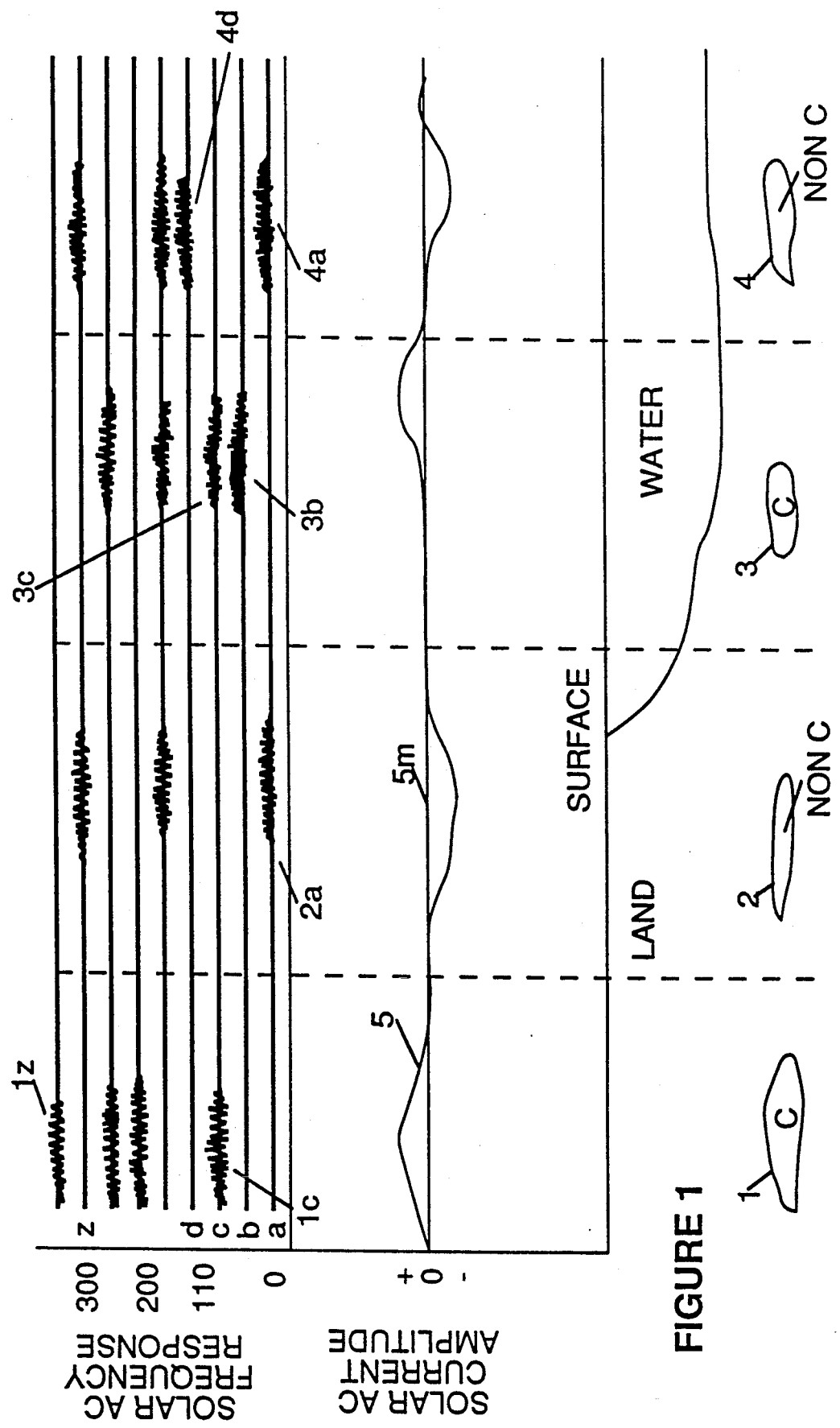
FIG. 1 represents a cross-section of the earth illustrating a surface/atmosphere interface and various subsurface and underwater anomalies as well as simulated data corresponding thereto.

As explained in detail in U.S. Pat. No. 4,825,165 as a poor conductor, a subsurface deposit such as oil, results in an ionic "shadow". Good conductor deposits such as iron ore results in a "focusing" ionic effect. Just as light in the visible spectrum permits intelligence gleaning through frequency modulations and resulting color differentials, the above-described generally vertical current leaking from the earth is also made of a spectrum of frequencies which are modulated through electrical resonance in unique ways by specific deposits, thus enabling remote identification of any surface and subsurface anomalies through which they have passed.

Accordingly, by sensing, recording and subsequently analyzing the measured amplitude, frequency and frequency modulations of the alternating current component emanating from the earth's surface, and correlating this data with geographical location, a systematic means such as that detailed in U.S. Pat. No. 4,507,611 for exploration of subsurface resources becomes possible.

The generally vertical current leakage from within the earth into the atmosphere occurs with a predictable geographic pattern indicative of natural and man-made substructure content. The monitoring, recording, and interpretation of the rate of leakage of the generally vertical current, plus the frequency spectrum and resonance modulation of that spectrum, forms one basis for the present invention which employs the fact that anomalous conductivity results in anomalous electric current variations. However, it should be understood that data resulting from other sources, for example, acoustic (pressure), resistive, or magnetic or electric, can also be used as the source of sequential frequency information through which the depth of a local anomaly is determined.

The monitored anomalous activity falls into two general categories. The first category is an anomalous object which moves near the earth's surface and disturbs the earth's magnetosphere. The second category is observed electrical anomalies from apparent stationary surface or subsurface conductive anomalies, the time variation of which disturbs the earth's magnetosphere.

An example of the first category, moving objects, might comprise a submarine whose passing would be manifested by a change in the electrical current emanating from the earth.

An example of the second category, stationary objects, might be a conductive anomaly, either man-made or naturally occurring, such as a steel spheres or the like, which, if placed below the earth's surface, would result in an increased local electrical leakage within the earth's magnetosphere, thus producing a local alteration in electrical current flow or in the flow of acoustic or magnetic waves.

Using the steel sphere example, it should be understood that phase and amplitude relationships existing in the monitored frequency spectrum of the earth are modified by the steel sphere. If these changes are observed under water, they appear as a modulation of existing electrical noise. If these changes are monitored above the surface, the basic RF carrier from the existing current becomes a modulated RF in close proximity to the steel sphere. If the vertical alternating current leakage to the side of and directly above the steel spheres is measured, the current flow above the sphere is higher.

The frequency, amplitude and resonance frequency modulation of the weak, low-noise signal provides data which, when properly interpreted, may be used to obtain information regarding subsurface or surface anomalies through which the signal has passed. This is due to the fact that the anomaly will provide varying amplitude, frequency, and frequency resonance modulation depending upon its ionic occultation or conduction properties. Ionic conduction variations are dependent upon the extent of the area and size of the anomaly as well as the type of material of which the anomaly is composed.

Turning now to the accompanying drawing and particularly FIG. 1, in the lower portion of FIG. 1 there is depicted a cross-section of a typical surface/atmosphere interface. Reference character 1 generally refers to a subsurface conducting anomaly. Reference character 2 refers to a subsurface nonconducting anomaly. Reference characters 3 and 4 refer to subsurface and underwater conducting and nonconducting anomalies respectively.

The upper portion of FIG. 1 illustrates several graphs which correlate data similar to that which would result from the performance of the method described in U.S. Pat. No. 4,507,611; which method will be now briefly reviewed as background.

The atmosphere above a predetermined region of the earth which is to be prospected is first traversed. This step can be accomplished by any convenient vehicle such as an aircraft. During a traverse, local variations which occur in a generally vertical current having an alternating component are measured. For monitoring events at a specific location, no traversal is performed.

Where traversal is performed during the measurement step the next step includes the recording of the measurements in correlation with the spatial relation of the point of the measurement to determine significant measurements indicative of surface or subsurface anomalies. Recording the measurements can be accomplished by any recording apparatus such as magnetic tape, strip charts or computer discs which is connected to the sensing apparatus used to measure local variations. The measurements taken can be correlated with the two-dimensional spatial relation of the point of the measurement by a technique such as that as described in U.S. Pat. No. 3,976,937 which discloses apparatus for recording sensor positions by the use of aircraft. Where no traversal by the measuring probe is done, this step is of course omitted.

Where traversal of an area by the sensing device is required, an aircraft is the preferred medium since it provides the highest search rate at the lowest cost. A trailing-wire antenna or other non-directional antenna can be towed from an aircraft. As will be apparent, other devices for towing or carrying an antenna can also be used. Such a trailing-wire antenna may be attached to an amplitude/frequency processor which is used to perform the measuring step. The other side of the processor may be grounded to the airframe. This produces a time rate of change measurement of the alternating current component. Any antenna which will sense the flow of the alternating current component may also be used.

As shown in the upper portion of FIG. 1, the measurement of the alternating current component preferably includes measurement of the frequency, amplitude, and frequency resonance modulation. Considering the simulated data appearing in FIG. 1, reference character 5 refers to a graphical illustration of the full frequency RMS value of the alternating current component amplitude. It can be seen by a comparison of the graphical illustrations to anomalies 1, 2, 3 and 4 that the alternating current amplitude is anticipated to be above a given mean level; for example, 5 milliamperes, when recording over conducting anomalies 1 and 3 and below the mean level when recording over the nonconducting anomalies 2 and 4. The specific differential of the alternating current component amplitude of the mean level may be used by the artisan to determine the type, amount, and area extent of the detected anomaly. This data may be used in conjunction with the alternating frequency data as detailed below.

The frequency data and frequency resonance modulation is preferably measured in a series of different frequency ranges, for example ranges a,b,c,d, ... z. The overall anticipated frequency range preferably varies from less than 1 HZ to 100 KHZ but is preferably in the range of 1 HZ to 50 KHZ. Two types of frequency measurements can be direct or indirect. Direct frequency measurements generally relate to those which are natural in origin, i.e., magnetic, acoustic or radiation waveform electric currents emanating from the earth, and the total spectrum of such frequencies is in the range of from about 0 to 100 KHZ. Indirect frequency measurements relate to detection of data from man-made sources, such as AM, FM, TV, radar, and the like, and extends across a range from about 1 KHZ to 100 MHZ or more. The measurement of direct frequency data gives a direct indication of depth, while measurement of indirect frequency data gives indirect depth information, since anomalies in the indirect range are caused by anomalies in the direct. For example, man-made (or indirect) wave energy can be made to interact with natural wave energy emanating from the ionosphere (direct). As the wave energy from the ionosphere changes with time, the variations can be measured directly, e.g., by means of a plasma probe, or indirectly by monitoring the scattered returns from the man-made radiated energy. Either approach would yield similar results. In practice, either direct, indirect, or a hybrid of the two can be used to monitor and analyze both direct and indirect data.

The frequency data, if properly plotted and analyzed, enables the observer to determine, based on empirically determined relationships, the depth and characteristic of any anomaly. Different types of anomalies will produce higher or lower signal amplitudes and differing frequency modulation patterns. Higher or lower signal amplitude suggest differing electrical resistance characteristics, while the differing modulation patterns represent differing electrical velocity patterns, as well as differing resonance features. The differing resonance/velocities and amplitude characteristics enable one trained in the art to identify the type of anomaly, i.e., deposit or target, while the frequency at which a pattern is noted indicates the depth of the anomaly or object of concern.

As will be understood by the artisan, by modifying the above described method, similar but stationary apparatus to that described above may be used to detect transient phenomena. For example, if seismic activity in the vicinity of a geological fault is to be monitored, a detector may be located near the fault. Since the detector is held stationary, when no seismic activity is occurring, there will be no change in the amplitude or frequency modulation of the alternating current or other frequency spectrum data being monitored as a function of time. The amplitude and/or modulation will only exhibit a time rate of change when a transient "anomaly" occurs in the vicinity of the detector. Similarly, if the passage of a large conducting or nonconducting mass past the vicinity of a given point is to be detected, a detector can be positioned at the point. A detector so positioned will display an amplitude and/or modulation variation in the frequency spectrum being monitored as the mass moves past. Thus, the present method may be used to remotely detect the passage of a submerged submarine, ice flow, or the like.

As used herein, "severe weather" is defined as weather which comprises an extremely high energy per cubic unit of atmosphere, for example, tornadoes, water spouts and wind shear. All share a common source of energy that is believed to be event in any particular location on earth in order to provide early warning of impending tornadoes or wind shear events or confirmation of predictions made based on other forecasting methods. Preferably, a series of preprogrammed detection devices can be installed in peripheral rings around airports and connected to a central processor to give advance warning or confirmation of the location of wind shear events in the vicinity of an airport.

Figure 2:
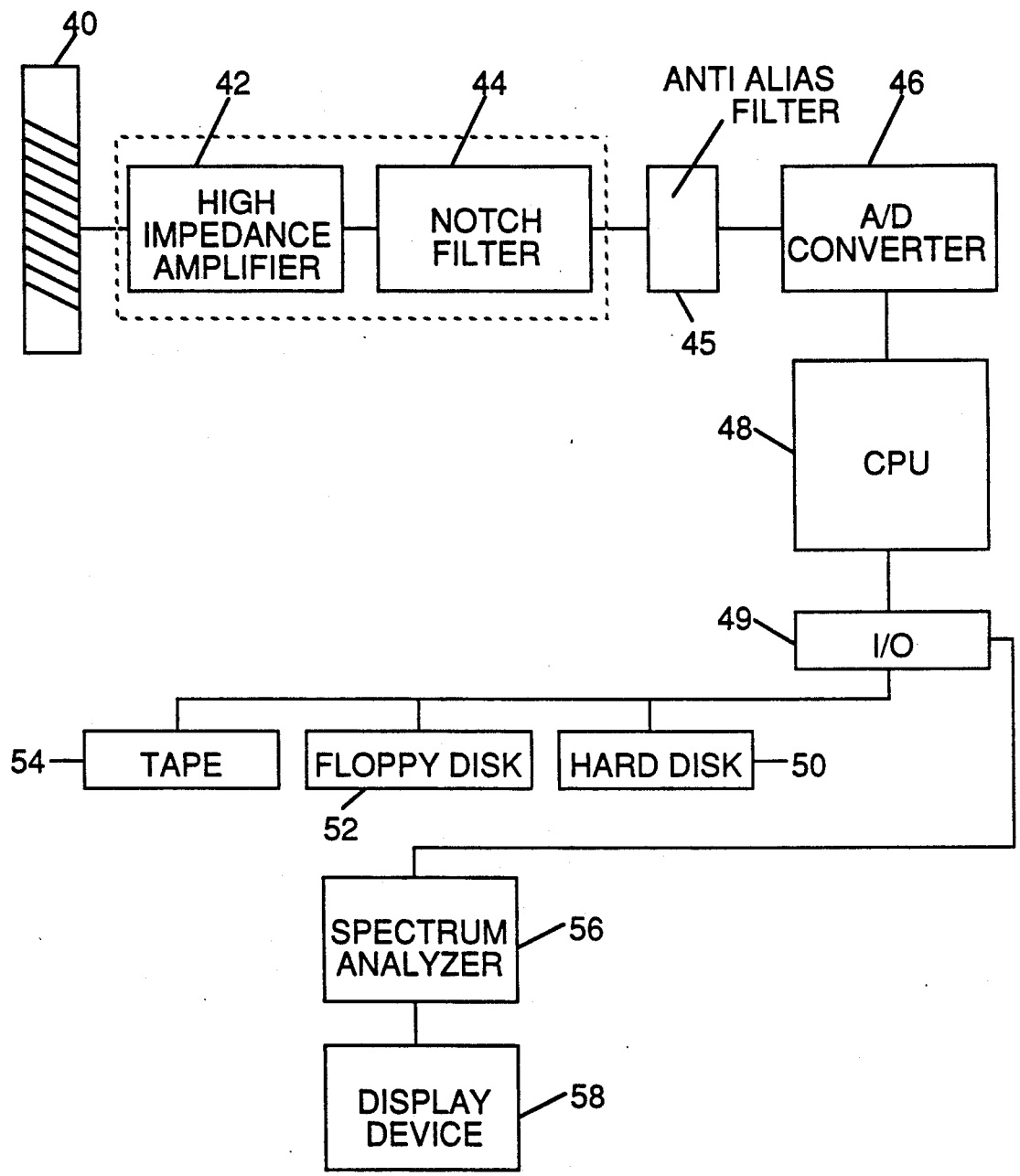
FIG. 2 is a schematic block diagram of the first embodiment of a detector according to the present invention.
Figure 2A:
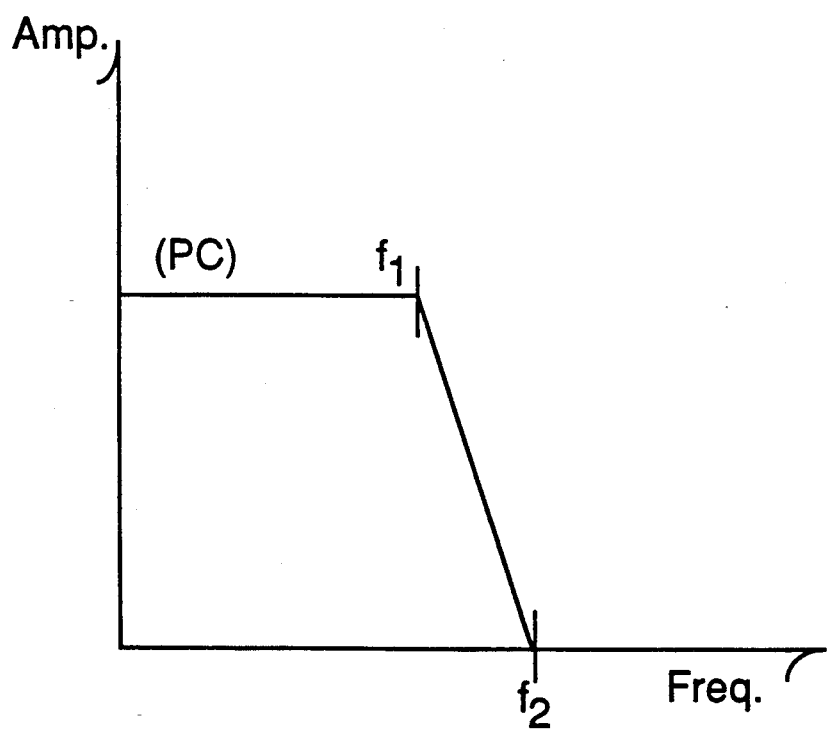
FIG. 2a is a graph depicting the filtering characteristic of the anti-alias filter of FIG. 2.

Turning now to FIGS. 2 and 2a, an example of a presently preferred embodiment of detectors useful for practicing the present method is illustrated.

FIG. 2 depicts the preferred system for acquiring and processing broad band AC signal data over a band pass of from about 0 HZ to 100 HZ, although a band pass of 0–10 KHZ is usually sufficient. The signals are received by an antenna 40 attached to a vehicle (not illustrated), then amplified in amplifier 42 and filtered in filter 44, and passed, via an anti-alias filter 45, to an analog to digital (A/D) converter 46, and then fed into a CPU 48, preferably a portable PC compatible computer or equivalent, where the data is passed via an I/O device 49, to a recording medium, preferably in the form of a hard disk 50, a floppy disk 52, a tape 54, or the like. The stored data can be analyzed and processed as described below using either a electrical in nature. Through empirical experiments, one can determine within the nominal spectrum of frequencies of interest, i.e., on the order of 1 HZ through 50 KHZ, the frequency spectrum signature that each severe weather event will be preceded or accompanied by. In other words, for each severe weather event electrical energy will be distributed in discrete frequency ranges along with discrete amplitude and modulation characteristics associated directly with those frequency patterns. Severe weather events are typically associated with unique pre-event subsurface electromagnetic activity. For example, waterspout formation is typically preceded by the formation of a swirl on the surface of water, which continues to accelerate until white caps are visible in areas that are otherwise flat calm. Only after many minutes of this surface activity does one begin to see atmospheric visualization, i.e., the characteristic "spout," and then activity at the base of the associated overcast. This electromagnetic precursor activity is spectrally unique for each basic type of severe weather. By monitoring the requisite frequency spectra and comparing the observed patterns with those empirically derived from previous events, one trained in the art can forecast impending severe weather events in a timely manner. Similarly, electromagnetic precursors can be used to warn of events, such as earthquakes. Preferably, computer software is used to identify the subsurface frequency pattern unique to a particular severe surface weather specially programmed computer or a spectrum analyzer 56 and a display device 59 such as a CRT, a strip chart, or X-Y recorder. The CPU is preferably a portable one which is battery powered and is preferably shock mounted on the vehicle to protect the disk drives.

For example, the time series of the received signals, which are recorded and stored on the recording medium 50 can, using the CPU 48 or other device, be transformed using a sliding time window, which is equivalent to digitally filtering the data into its various frequency components. The transformed data is then used to generate plots of the power level in various bands versus distance or time on an output device such as plotter 58.

Alternatively, in lieu of the CPU-based system, a spectrum analyzer can be used and multiple vehicle passes can be made. However, with the all-digital system of FIG. 2., any frequency or combination of frequencies can be chosen for making profiles, even long after the original data has been recorded. Other types of processing can also be performed on the time series, which may be found to provide even more useful information regarding the subsurface geological structure.

More preferably, the data acquisition system of FIG. 2 is based on a 10 KHZ band pass. Use of a 10 KHZ signal, digitized to 12 bit accuracy, and with two samples per cycle at the upper (Nyquist) limit of 10 KHZ, 2 bits per cycle times 12 bits per voltage measurement times 10,000 cycles per second, means that 240,000 bits per second of data will be generated. For a 16 bit computer, this implies 15,000 bytes per second, or a 15,000 baud input. One minute of data acquisition thus generates 60 times 15,000, or 900,000 bytes of data.

Preferably, this data is stored on a hard disk, and can be later transferred to a tape backup system 52 for mass storage. Typical hard disks store between 20 and 300 megabytes of data, or between 20 and 300 data runs. Therefore, tape backup storage will be desirable if the data is to be retrieved later for further analysis.

Preferably, the input to the A/D convertor 46 consists of the output of the antenna 40, conditioned by pre-amplifier 42, which is preferably a high input impedance amplifier in order to accurately measure the extremely small signals of interest. The filter 44 is preferably a 60 HZ notch filter. The filter 45 is preferably an anti-alias filter to prevent unwanted high-frequency signals from intefering with the band waves of interest. The analog-to-digital converter 46 can be any of several commercial boards, such as those available from Metra Byte or Lotus, which plug into a commercially available PC, such as an IBM AT or IBM 386 compatible computer. For data collections requiring processing of large amounts of data, more powerful CPU's, such as work stations or mini-computers, would of course be required. The board converts the analog signal into a sequence of digital signals. Using computer software which comes with the board, the digital signals are then stored in computer memory, for example, on the hard disk 50. This stored information represents the time-varying signal actually received by the antenna.

The anti-alias filter 45 is in the form of a low-pass filter having a filtering characteristic such as that depicted in FIG. 2a. The filter 45 prevents higher frequency information from interfering with the accuracy of the frequency band being sampled. The filter should be selected so that the frequency f1 is set at the highest sampling frequency of interest. The frequency f2 should be set so that the filter roll off is as steep as practical. For example, if f1 were set at 10 KHZ, and a 72 db drop in the filter characteristic were desired, f2 should be selected to be about 20 KHZ.

A "file" on the hard disk containing this information can then be processed using commercially available, preferably menu driven software, such as "Asystant", which produces printed output and which can process a wide variety of processing algorithms on data to generate many kinds of information, including a "frequency filter" For a time series of data lasting, for example, 12 minutes, a sliding window one second long could be applied to the data, in which the time series is Fourier transformed, and power spectra generated at a variety of frequencies in the band between about 10 HZ and 10 KHZ. If 20 different frequencies are used, each a factor of about 1.4 greater than the one below, this would lead to frequencies of 10 HZ, 14 HZ, 19.6 HZ, 27.4 HZ, etc., up to 10 KHZ. A time series in each frequency band over the 12 minute time period of the data would be generated.

Figure 3:
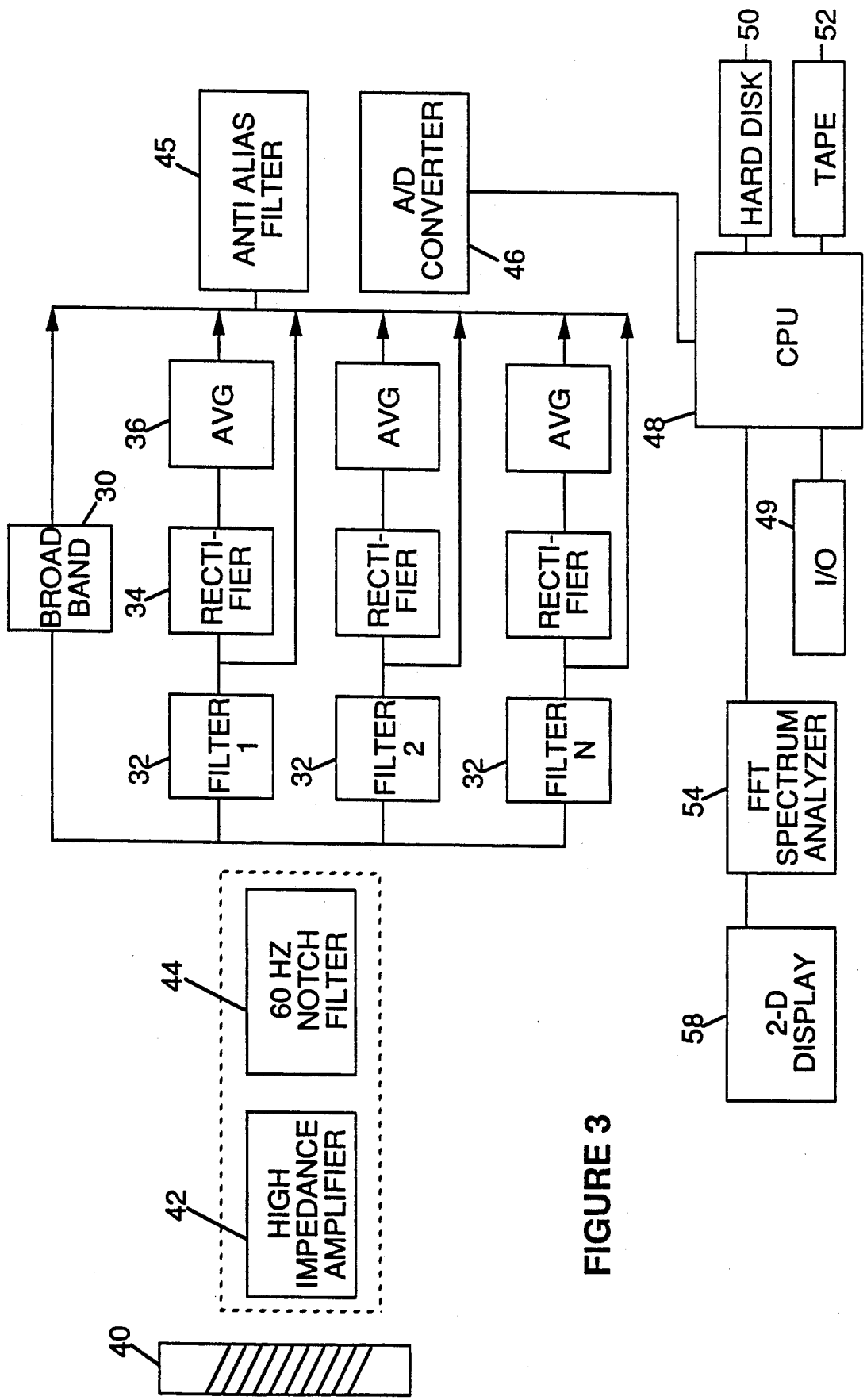
FIG. 3 is a schematic diagram illustrating an embodiment of the detector of FIG. 2.

FIG. 3 is an illustration of a presently preferred embodiment of the invention. In FIGS. 2 and 3, similar devices are identified by similar reference numbers. In FIG. 3, the antenna 40 preferably comprises a spiral wound split helix forming a vertically oriented omni directional diepole. The antenna 40 feeds into a high impedance differential amplifier containing a 60 HZ notch filter. The output is directed to a broad band processor 30 (0–40 KHZ nominal) and then through filter 45 into an A/D converter 46. An alternate process is to feed the signal through specific filters 32. Each of the filters 32 defines a frequency band of interest. The filtered signals are then passed via filter 45 to the A/D converter directly for depth measurement and/or through a rectifier 34 so that any dc level can be removed and then through an averaging circuit 36. The signals are then preferably passed through filter 45 to the A/D converter 46. The digitized signal is preferably stored on a hard disk but a floppy type or other storage media can be used as would be apparent to the artisan. The data is subsequently subjected to FFT spectral analysis in an analyzer 38 such as a Hewlett-Packard 3580A Spectrum Analyzer and displayed in two dimensions in a strip chart, on a CRT or other output display device. Side-by-side placement of the two dimensional displays can then produce three dimensional exhibits. This data acquisition and processing system can produce near photographic quality images of subsurface structures or targets.

Figure 4:
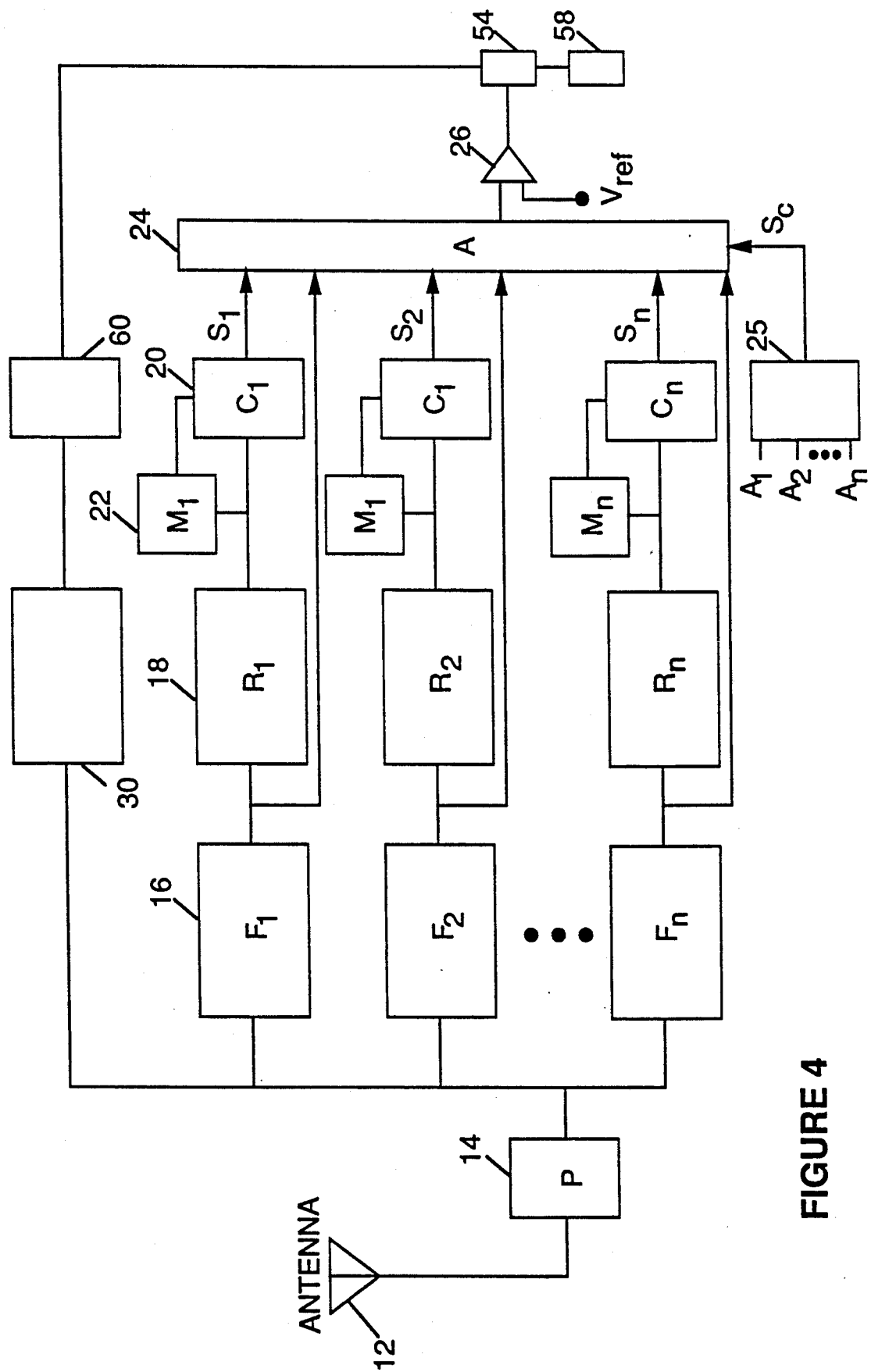
FIG. 4 is a schematic block diagram of another embodiment of a detector according to the present invention.

Turning now to FIG. 4, an alternative detection and recording apparatus is depicted. In FIG. 4, the reference number 10 generally refers to the detector unit. Signals are received at an antenna 12. The antenna may advantageously be a diepole antenna of the type described in *Antennas and Transmission Lines* by John A. Kueken, 1st ed., 1969.

The output of the antenna is amplified by a high-impedance broad band preamplifier 14. The preamplifier may be of the type described in *Application Manual For Operational Amplifiers*, Philbric/Nexus Research, Nimrod Press, 1968.

The output from the preamplifier is filtered into "n" bands by "n" band pass filters 16. The band pass filters may be of the type described in *Application Manual For Operational Amplifiers* (supra), see circuit illustration designated III.27. Preferably, the frequency bands range from very low frequencies to high frequencies. For example, for low resolution depth determinations, the lowest frequency band might cover the range of 1 HZ to 10 HZ. The next highest frequency band may cover the range from 10 to 100 HZ, the next highest frequency band may cover the range from 100 HZ to 1 KHZ, etc., up to high frequencies such as 1 MHZ. For higher resolution depth determination, the band may be narrowed to as small as a fraction of a HZ (i.e., 0.1 to 1 HZ) at extremely low frequencies to slightly larger bands (i.e., 1 to 10 HZ) at intermediate frequencies and to even higher bands (i.e., 10–100 HZ) at relatively high frequencies. The signals monitored in different frequency bands yield information useful for different purposes. For example, low frequencies may be used to provide early warnings of very deep phenomenon such as earthquakes occurring far below the surface of the earth or ocean. For monitoring transient phenomena occurring near the surface, higher frequency bands would be more useful. As a general rule, it is preferable to monitor each frequency for relative changes over time in order to obtain as much useful information as possible regarding the transient phenomena which is occurring. It is noted that for purposes of predicting severe weather systems, frequency ranges as low as 0.1 HZ to 1 HZ may be used.

For depth determination or monitoring, the frequency information is passed directly to the adder 24. For purposes explained in U.S. Pat. No. 4,825,165, the output from the band pass filter may also be fed to a rectifying circuit, 18, which outputs a signal indicative of the mean amplitude of the signal in each frequency band over a time period $T_i$. The averaging period $T_i$ is chosen so that it will be much less than the time over which the transient phenomenon being observed takes place. A typical rectifier may be of the type described in *Electronics Designers Handbook*, 2nd Ed. revised, L. J. Giacoletto, McGraw Hill, 1977, Sec. 12.4.

The output of each of the time-averaging rectifiers 18 is inputted to a respective comparator circuit 20, which compares the output of the time averaging rectifier 18 with the output of a second time averaging circuit 22. Each time-averaging circuit 22 will typically average the output of an associated time-averaging circuit 18 over a longer time period $t_i$ which is much larger than $T_i$. Typically, $t_i$ is on the order of, or greater than, the time scale of the observed transient phenomenon. Thus, the time-averaging circuit 22 provides a "reference" value for the comparator 20. The time-averaging rectifier circuit 22 may also be of the type described in *Application Manual For Operational Amplifiers* (supra). In other words, similar averaging filter designs may be suitable for both the short-term and long-term averaging circuits 18 and 22; only the averaging time periods used in each circuit need be different. The signals ($S_1, S_2 \ldots S_n$) from the comparators 20 of each of the frequency bands are combined in an "adder" 24. Various suitable adding circuits are described in the *Application Manual For Operational Amplifiers* (supra). While the adder 24 is normally an adder, it should be understood that the signals $S_1, S_2 \ldots S_n$ from some frequency bands are added while others are subtracted. Whether a signal is added or subtracted depends upon whether the amplitude change in the frequency range is a transiently increasing or decreasing one for the particular phenomenon being monitored.

An auxiliary signal generator 25 may be used to generate a "corrective signal" ($S_c$) which is inputted to the adder 24 in order to enhance the accuracy of the measurements by weighing pertinent environmental parameters $A_1, A_2 \ldots A_n$ in the manner detailed above. As will be understood by the artisan, the generator 25 may simply comprise a junction point for inputting pertinent environmental parameters to be the adder 24. Alternatively, the generator 25 may have an appropriate transfer function for weighing the inputted environmental parameters and generating therefrom the corrective signal $S_c$.

For simple depth determination or monitoring, the signals for each frequency band are passed directly to the adder 24.

The combined signal from the adder is passed through a comparater 26 to a spectral analyzer 54 and to a recording or display device 58. Alternatively, the signal from the amplifier 14 can pass directly through a broad band amplifier 30 to a recording device 60, where it is stored for later analysis by the spectral analyzer 54.

In an experiment performed by the inventor, an antenna having about a five inch diameter and a nine foot height was used. The antenna consisted of a tube wound with 18 gauge solid insulated wire in a loose helical winding connected to the input of the Hewlett Packard 3580A spectrum analyzer. The Hewlett Packard 3580A is a low frequency instrument that has been optimized for use in the 5 HZ to 50 KHZ range.

Figure 5:
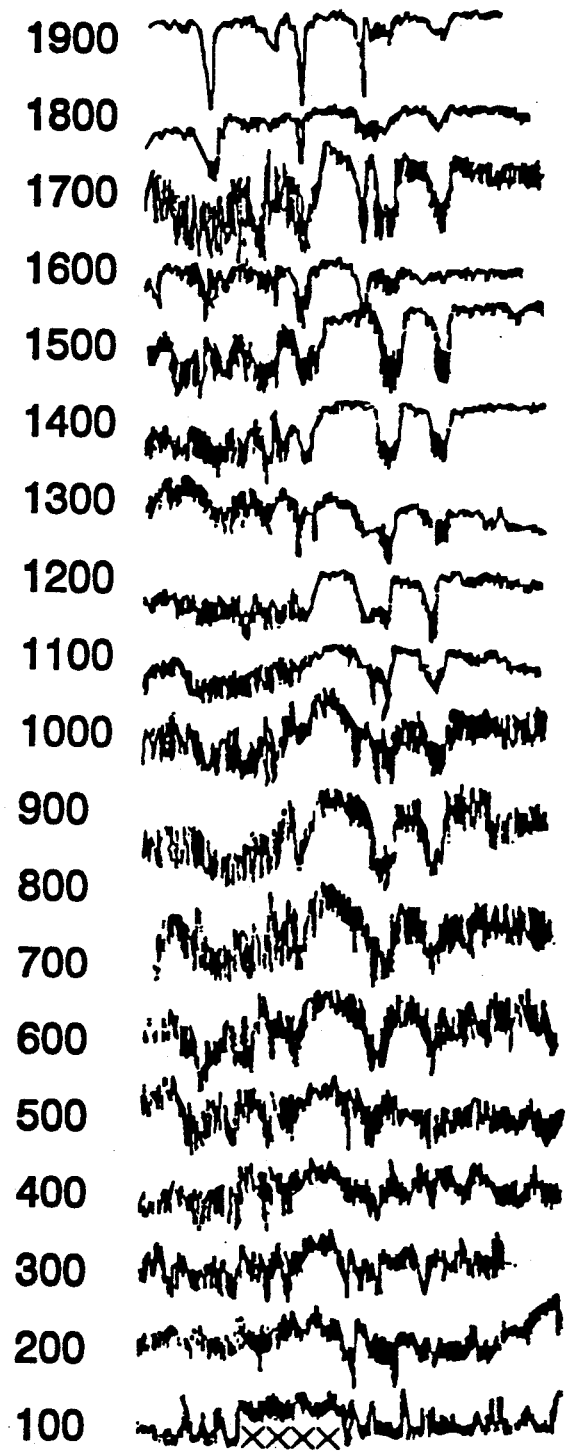
FIG. 5 is a graph depicting the results of an experiment.

The Hewlett Packard 3580A was tuned in 100 HZ increments starting at 100 HZ and progressing in 100 HZ increments up to and including 2,000 HZ. The antenna was caused to traverse an area containing five active oil well sites containing oil bearing deposits of known location. Subsequent analysis of runs were made in 100 HZ increments and recorded on an ASTRO-MED DASH 11 MODEL MT DIRECT-WRITING RECORDER. Graphical results from this experiment appear in FIG. 5. The locations of five producing oil wells adjacent to the highway traversed are shown as circles A–E at the bottom of FIG. 5. The first signal trace at 100 HZ at the bottom of FIG. 5 clearly outlines the area containing all five of the oil wells. It is well known that to actually locate oil or gas deposits, the local geology must contain the deposits in a leak-proof structure that in fact performs the function and has the prerequisite shape to form a trap for the oil and/or gas deposits. The data of FIG. 5 demonstrates the existence of such a shape over the known location of the oil wells. Further, the data displayed clearly shows the required "entrapment" geology in the frequency lines directly above the marked location of each oil well. Comparing modulation patterns in the upper right-hand quadrant of FIG. 5 of 1,000 HZ through 1,700 HZ to the upper left-hand quadrant for the same frequencies, reflect the intersection of different modulations indicating a dividing line between two different geologic structures. Generally, at a transition between dissimilar structures, the liquid content or density of the adjacent structures will differ, giving rise to the differences in modulation.

Figure 6:
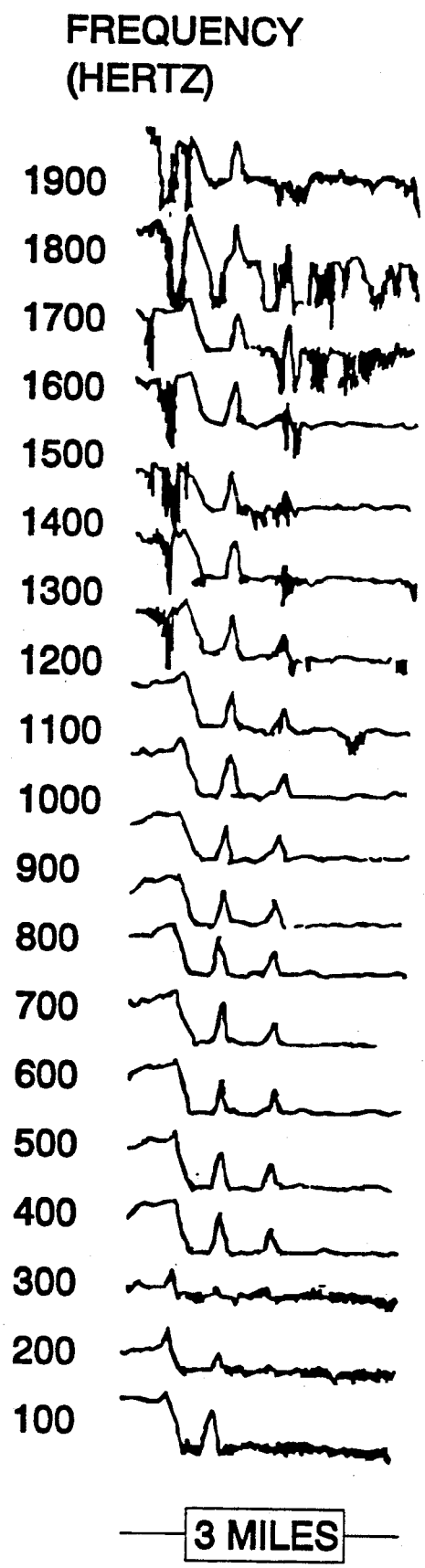
FIG. 6 is a graph depicting the results of an experiment.

An additional experiment was performed traversing a 3-mile route in several runs from east to west. The route traversed was above a large geological rift running north and south. The equipment used in this series of readings was the same as that used above, except that the antenna used had a larger diameter and longer axial length than the previously used antenna. The larger antenna would provide a better signal-to-noise ratio. Twenty-one separate traversals were made across the 3-mile segment. During each pass, a separate frequency was recorded. The first pass was made measuring frequencies at 100 HZ, and each subsequent pass detected frequencies 100 HZ higher. In other words, traversals were made recording frequencies from 100 HZ to 2,000 HZ in 100 HZ increments. The results of the traversals are shown in FIG. 6.

The higher frequency traversals, which indicate areas closer to the surface, show an area of high modulation on the right-hand side of the traces. This is indicative of an area of either high-liquid content or low-density material.

All of the traces show a similar large amplitude change about one-third of the distance from the left-hand side of the trace. This is indicative of the known rift in the geology of the area over which the tracings were made. In traces made at frequency of from 400 HZ to about 1,900 HZ, a clear spike is present in the middle of the trace. This sharp change in amplitude is indicative of a containment formation which exists at all but the lowest depths monitored in the survey.

Figure 7:
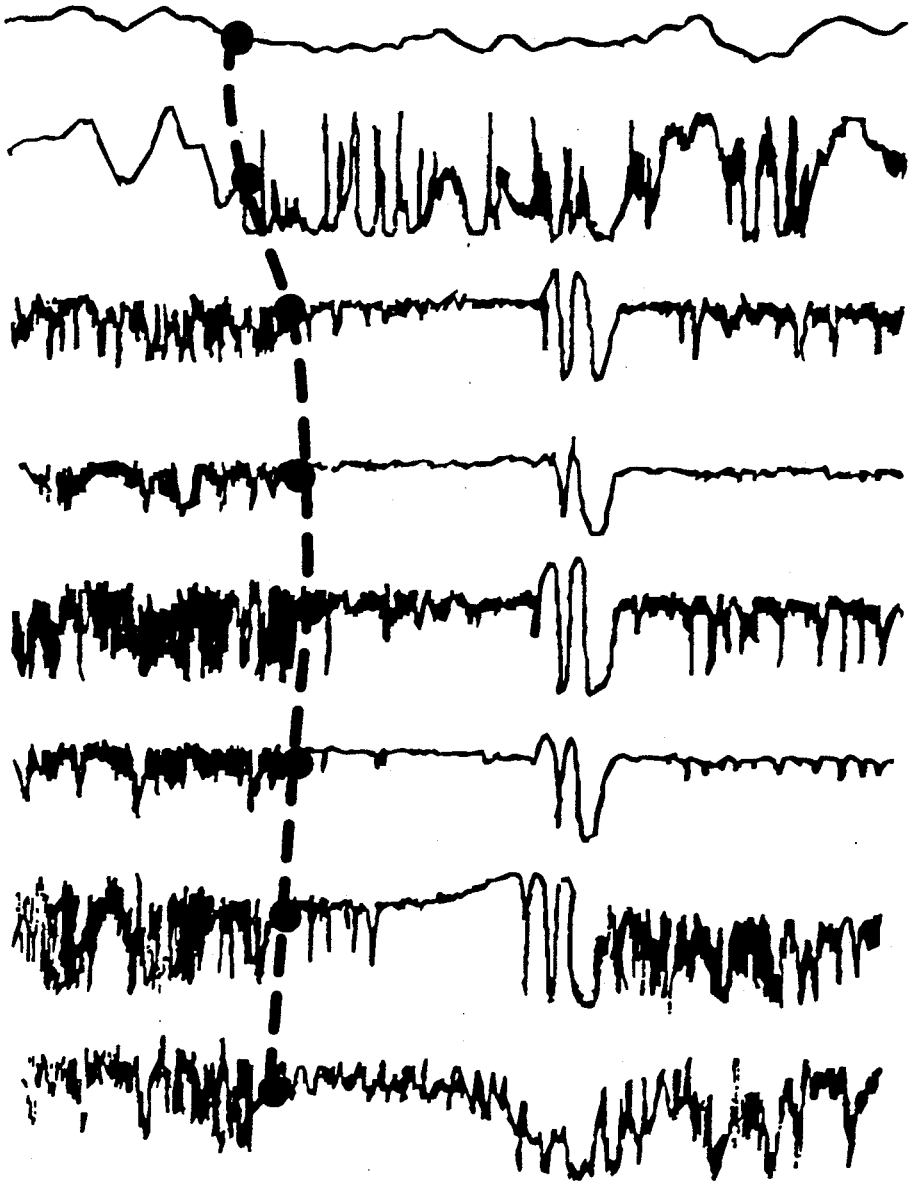
FIG. 7 is a graph depicting the results of an experiment.

Multifrequency spatial measurement experiments were also made by the inventor at the San Andreas fault just east of Palm Springs, Calif. The equipment and techniques employed in these experiments of fault measurements were identical to that used in the above experiments, except the receiver used to survey the oil field was a tunable spectrum analyzer, while at the San Andreas fault two separate fixed receivers were used. The first was an HP 3400 A RF Voltmeter with a response from 10 HZ through 10 MHZ used with a loop antenna. All other San Andreas fault measurements were made using the same antenna as the oil well measurements but using two fixed frequency receivers. These receivers were high impedance differential amplifiers tuned to different frequency during different passes over the fault. The results, depicted in FIG. 7, show a consistent relationship between frequency and depth and amplitude and modulation differences to depict the different geologic structures.

The known subterranean geologic structures were clearly discernable in the data. Regarding the San Andreas data, when the data taken is stacked in frequency sequence as in FIG. 7, a clear curvature was shown in the San Andreas fault indicating a concave surface known to exist between the two plates. The large depressions labeled "A" and "B" evident in most traces resulted from overhead power lines. A dashed line has been drawn in FIG. 7 to connect the points where the modulation pattern for each frequency changes abruptly, indicative of a dividing point between the two geologic structures. The line connecting these points demonstrates a clear curvature at the western end of the fault at this location at a depth that corresponds to a frequency of 26 HZ. The coherent curve evident in this frequency sequential depiction reflects data from different depths, and further demonstrates that frequency data is directly related to depth, while amplitude and modulation changes relate to other characteristics.

The foregoing description of a preferred embodiment of the invention has been presented for purposes of illustration and description. It is not intended to be exhaustive or to limit the invention to the precise form disclosed and, obviously, many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method of passively determining the depth of a spatial or temporal anomaly occurring beneath the terrain or water surface of the earth and in the vicinity of a location of interest, comprising the steps of:

passively monitoring a time-varying signal from a source emanating from the earth;

measuring the amplitude or modulation changes in said time-varying signal in the form of a broad spectrum of frequency data for variations indicative of a spatial or temporal anomaly;

recording said data in a recording medium;

processing said data to produce a sequential frequency spectra of said time-varying signals within a frequency band of interest, wherein each frequency spectra is representative of a particular depth; and identifying the location of said spatial or temporal anomaly with said processed data.

2. The method of claim 1 further comprising the step of measuring amplitude and modulation characteristics of said time-varying signal; and wherein said step of processing further comprises comparing said recorded amplitude and modulation characteristics with empirically determined data to identify the location of said anomaly.

3. The method of claim 1 wherein said step of measuring comprises detecting said time-varying signals with an antenna.

4. The method of claim 3 wherein said step of measuring further comprises amplifying and filtering a signal from said antenna.

5. The method of claim 3 wherein said step of recording further comprises the steps of digitizing said signal and recording the digitized data.

6. The method of claim 5 wherein said step of processing comprises processing in a CPU to generate a digitized power spectra from said digitized data.

7. The method of claim 1 wherein said anomaly comprises a subsurface seismic event.

8. The method of claim 1 wherein the step of measuring further comprises measuring within discrete frequency bands variations which occur in said frequency data.

9. The method of claim 6 wherein the step of measuring further comprising measuring variations which occur in an amplitude and modulation of a generally vertical current emanating from the earth within said discrete frequency bands.

10. The method of claim 1 wherein the step of measuring further comprises measuring local variations which occur in an amplitude and modulation of a generally vertical current emanating from the earth.

11. A method of locating a temporal or spatial anomaly comprising:

receiving, with an antenna, signals originating from a source emanating from the earth indicative of an alternating component of a generally vertical current emanating from the earth;

filtering said signals into a plurality of frequency bands, each indicative of a characteristic depth of an anomaly; and processing said filtered signals with data corresponding to said phenomenon to thereby indicate the location and depth of said anomaly.

12. An apparatus for passively detecting the location and depth of a spatial or temporal anomaly comprising:

means for receiving a broad spectrum frequency emanating from the earth;

means connected to said receiving means for separating said signal into a plurality of signals corresponding to a plurality of frequency bands;

means connected to said separating means for recording the signals in each of said frequency bands; and means connected to said recording means for processing the plurality of frequency signals with data correlating said frequency information to depth to thereby indicate the depth of the anomaly.

13. The apparatus of claim 12 wherein said receiving means comprises an antenna.

14. The apparatus of claim 13 wherein said receiving means further comprises means for amplifying said signal.

15. The apparatus of claim 12 wherein said separating means comprises a plurality of band-pass filters corresponding to said plurality of frequency bands.

16. The apparatus of claim 14 wherein said processing means further comprise an analog to digital converter connected to a rectifier means, and a digital computer connected to receive input signals from said analog to digital converter and programmed to determine a depth from the frequency band of said input signals.

17. An apparatus for passively detecting the depth of a spatial or temporal anomaly comprising:

means for receiving a broad spectrum frequency emanating from the earth;

means connected to said receiving means for amplifying and filtering said signal;

means connected to said amplifying and filtering means for recording said signal; and means connected to said recording means for processing said signals to correlate said frequency information to depth to thereby indicate the depth of said anomaly.

18. The apparatus of claim 17 wherein said receiving means comprises an antenna.

19. The apparatus of claim 17 further comprising means for digitizing said signals and for starting said signal in digitized form.

20. The apparatus of claim 19 wherein said processing means further comprise a digital computer connected to receive said digitized signals and programmed to determine a depth from the frequency information of said signal.

21. A method of passively monitoring onset and depth of a temporal anomaly occurring between the terrain or water surface of the earth and in the vicinity of a location of interest, comprising the steps of:

measuring a time-varying signal emanating from the earth in the form of a broad spectrum of frequency data for variations indicative of the depth of said spatial or temporal anomaly;

recording said data in a recording medium;

processing said data to produce a normal sequential spectra of time-varying signals within a frequency band of interest, wherein each spectra is representative of a particular depth;

monitoring said time-varying signals over time;

comparing the monitored signals with said normal spectra of time-varying signals; and generating a signal when the amplitude or modulation of said time-varying signals change over time.

* * * * *